US012126127B2

(12) United States Patent
Yang et al.

(10) Patent No.: US 12,126,127 B2

(45) Date of Patent: Oct. 22, 2024

(54) FEMALE CONNECTOR

(71) Applicant: Cheng Uei Precision Industry Co., LTD., New Taipei (TW)

(72) Inventors: Cheng-Wang Yang, Dong-Guan (CN); Yan Sun, Dong-Guan (CN); Hsin-Min Chao, New Taipei (TW)

(73) Assignee: CHENG UEI PRECISION INDUSTRY CO., LTD., New Taipei (TW)

(*) Notice: Subject to any disclaimer, the term of this patent is extended or adjusted under 35 U.S.C. 154(b) by 414 days.

(21) Appl. No.: 17/746,932

(22) Filed: May 17, 2022

(65) Prior Publication Data

US 2023/0035044 A1 Feb. 2, 2023

(30) Foreign Application Priority Data

Jul. 28, 2021 (CN) ......................... 202121736504.1

(51) Int. Cl.

| | |
|---|---|
| ***H01R 13/6594*** | (2011.01) |
| ***H01R 13/405*** | (2006.01) |
| ***H01R 13/506*** | (2006.01) |
| ***H01R 13/508*** | (2006.01) |
| ***H01R 13/516*** | (2006.01) |
| ***H01R 24/60*** | (2011.01) |

(52) U.S. Cl.

CPC ........... *H01R 24/60* (2013.01); *H01R 13/405* (2013.01); *H01R 13/506* (2013.01); *H01R 13/508* (2013.01); *H01R 13/516* (2013.01); *H01R 13/6594* (2013.01)

(58) Field of Classification Search

CPC .. H01R 13/405; H01R 13/506; H01R 13/508; H01R 24/60; H01R 13/648–6599

See application file for complete search history.

(56) References Cited

U.S. PATENT DOCUMENTS

| | | | | |
|---|---|---|---|---|
| 2010/0035465 A1* | 2/2010 | Wang | H01R 13/502 439/541.5 |
| 2011/0269343 A1* | 11/2011 | Chen | H01R 13/6474 439/626 |
| 2015/0333447 A1* | 11/2015 | Bai | H01R 13/6456 439/607.54 |
| 2018/0287288 A1* | 10/2018 | Shah | H01R 13/504 |

* cited by examiner

*Primary Examiner* — Tulsidas C Patel
*Assistant Examiner* — Carlos E Lopez-Pagan
(74) *Attorney, Agent, or Firm* — Cheng-Ju Chiang

(57) ABSTRACT

A female connector includes an insulating body, a terminal module, at least one elastic element and at least one lateral shell. At least one side of the insulating body defines an opening. A middle of the insulating body defines an accommodating space. The terminal module is mounted in the accommodating space. The terminal module includes a plurality of terminals. The at least one elastic element is mounted to a surface of the insulating body which is parallel to an extending direction of each terminal. The at least one elastic element has a clamping portion, and a transverse width of the clamping portion is equal to a distance between two inner surfaces of two sides of the insulating body. The at least one lateral shell is assembled to at least one side surface of the insulating body.

14 Claims, 8 Drawing Sheets

FEMALE CONNECTOR

BACKGROUND OF THE INVENTION

1. Field of the Invention

The present invention generally relates to a female connector, and more particularly to a female connector which enhances an insertion and withdrawal force and prevents a spring arm from breaking or deforming.

2. The Related Art

A high-definition multimedia interface (HDMI) is a full-digital audio and video interface for transmitting uncompressed video, video signals, and compressed or uncompressed digital audio data from an HDMI-compliant source device, such as a set-top box, a digital video disk (DVD) player, a personal computer, a television, a game console, an integrated expander, a display controller, a compatible computer monitor, a video projector or a digital audio and television device. HDMI transmits both audio signals and the video signals with a single cable, a system wiring installation is greatly simplified.

Contacting areas of an upper spring piece and a lower spring piece of a conventional HDMI connector which is a female connector are small, the female connector hardly keeps a stable insertion and withdrawal force. Moreover, two spring arms located at two sides of the female connector are extended towards an insertion opening of the female connector, an extending direction of each spring arm is opposite to an insertion direction of a male connector, so the two spring arms are easily caused to be broken or be deformed due to an insertion of the male connector.

Therefore, it is necessary to provide a female connector which enhances an insertion and withdrawal force and prevents a spring arm from breaking or deforming.

SUMMARY OF THE INVENTION

An object of the present invention is to provide a female connector, which enhances an insertion and withdrawal force and prevents a spring arm from breaking or deforming. The female connector is adapted for being connected with a male connector. The female connector includes an insulating body, a terminal module, at least one elastic element and at least one lateral shell. At least one side of the insulating body defines an opening transversely penetrating through the at least one side of the insulating body. A middle of the insulating body defines an accommodating space penetrating through a front surface and a rear surface of the insulating body. The terminal module is mounted in the accommodating space. The terminal module includes a plurality of terminals. The plurality of the terminals extend longitudinally and are mounted in the insulating body. The plurality of the terminals are arranged transversely. The at least one elastic element is mounted to a surface of the insulating body which is parallel to an extending direction of each terminal. The at least one elastic element has a clamping portion extending towards a front end of the insulating body, and a transverse width of the clamping portion is equal to a distance between two inner surfaces of two sides of the insulating body. The at least one lateral shell is assembled to at least one side surface of the insulating body. The at least one lateral shell is disposed perpendicular to the extending direction of each terminal. The at least one lateral shell has a spring arm arranged corresponding to the opening, and a curved structure arched inward from a tail end of the spring arm. The spring arm is extended from a front end of the at least one lateral shell to a rear end of the at least one lateral shell, and then is inclined towards the at least one side surface of the insulating body, so an extending direction of a front end of the spring arm is parallel to an insertion direction of the male connector to avoid the spring arm from breaking or deforming.

Another object of the present invention is to provide a female connector. The female connector includes an insulating body, a terminal module, two elastic elements and two lateral shells. Two sides of the insulating body define two openings transversely penetrating through the two sides of the insulating body. A middle of the insulating body defines an accommodating space penetrating through a front surface and a rear surface of the insulating body. The terminal module is mounted in the accommodating space. The terminal module includes a plurality of terminals. The plurality of the terminals extend longitudinally and are mounted in the insulating body. The plurality of the terminals are arranged transversely. The two elastic elements are disposed at an upper surface and a lower surface of the insulating body which are parallel to an extending direction of each terminal. Each elastic element has a clamping portion extending towards a front end of the insulating body, and a transverse width of the clamping portion is equal to or more than a distance between two inner surfaces of two sides of the insulating body. The two lateral shells are arranged to two side surfaces of the insulating body which are perpendicular to the extending direction of each terminal. Middles of front ends of the two lateral shells are punched inward to form two spring arms. The two spring arms are arranged corresponding to the two openings. A tail end of each spring arm is arched inward to form a curved structure. The curved structures of the two lateral shells project into the accommodating space from the two openings.

Another object of the present invention is to provide a female connector. The female connector includes an insulating body, a terminal module, two elastic elements and two lateral shells. Two sides of the insulating body define two openings transversely penetrating through the two sides of the insulating body. A middle of the insulating body defines an accommodating space penetrating through a front surface and a rear surface of the insulating body. The insulating body has an upper bevel disposed at a front end of an upper surface of the insulating body, and a lower bevel disposed at a front end of a lower surface of the insulating body. The upper bevel is inclined downward and frontward. The lower bevel is inclined upward and frontward. A transverse width of the upper bevel is equal to or more than a distance between two inner surfaces of the two sides of the insulating body. A transverse width of the lower bevel is equal to or more than the distance between the two inner surfaces of the two sides of the insulating body. The terminal module is mounted in the accommodating space. The terminal module includes a plurality of terminals. The plurality of the terminals extend longitudinally and are mounted in the insulating body. The plurality of the terminals are arranged transversely. The two elastic elements are disposed at an upper surface and a lower surface of the insulating body which are parallel to an extending direction of each terminal. Each elastic element has a clamping portion extending towards a front end of the insulating body, and a transverse width of the clamping portion is equal to or more than a distance between two inner surfaces of two sides of the insulating body. Two middle sections of the two clamping portions of the two elastic elements are inclined along two extending directions of the upper bevel and the lower bevel to form two contacting portions. The two contacting portions of the two elastic elements are covered to the upper bevel and the lower bevel. The two lateral shells are arranged to two side surfaces of the insulating body which are perpendicular to the extending direction of each terminal. Middles of front ends of the two lateral shells are punched inward to form two spring arms. The two spring arms are arranged corresponding to the two openings. A tail end of each spring arm is arched inward to form a curved structure. The curved structures of the two lateral shells project into the accommodating space from the two openings.

As described above, a transverse width of an upper clamping portion and a transverse width of a lower clamping portion are designed to be equal to the distance between the two sides of the insulating body to increase contacting areas of an upper clamping portion and a lower clamping portion. Moreover, the upper clamping portion and the lower clamping portion exert clamping forces to an upper surface and a lower surface of a docking interface, so the female connector enhances an insertion and withdrawal force and prevents the spring arm from breaking or deforming to stabilize a connection between the female connector and the male connector.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
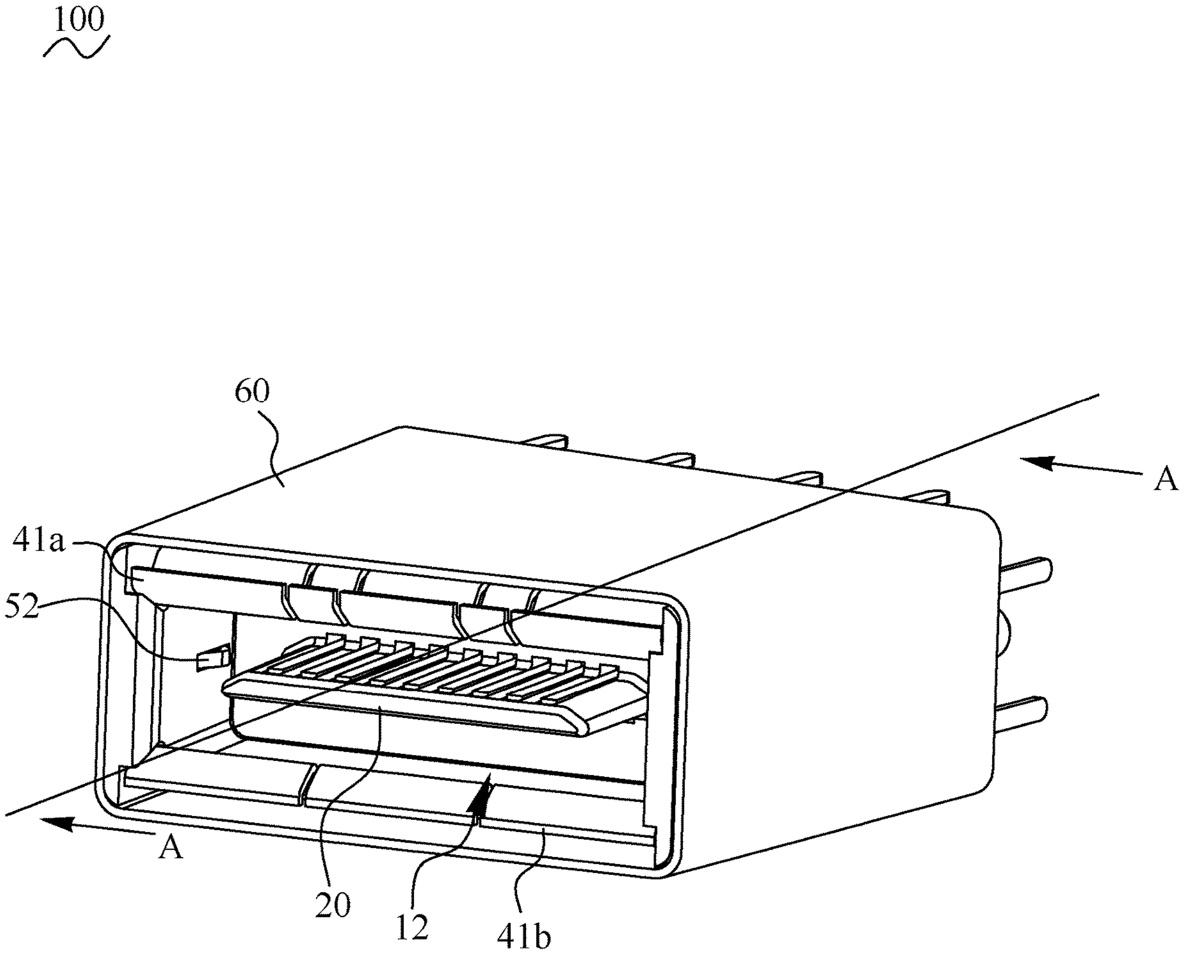
FIG. 1 is a perspective view of a female connector according to a preferred embodiment of the present invention.
Figure 2:
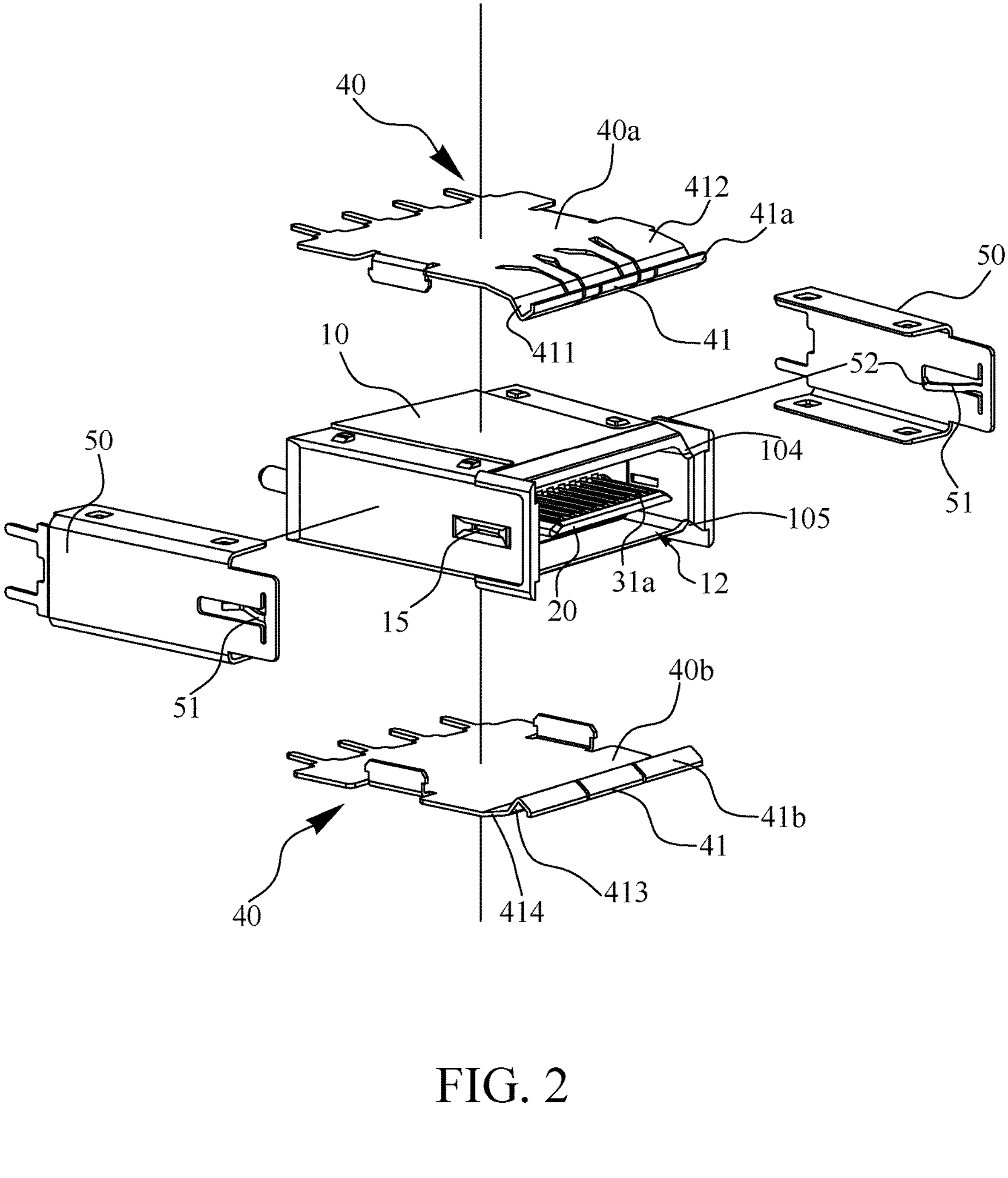
FIG. 2 is a partially exploded view of the female connector, wherein two elastic elements and two lateral shells are moved away from the female connector according to the preferred embodiment of the present invention.
Figure 3:
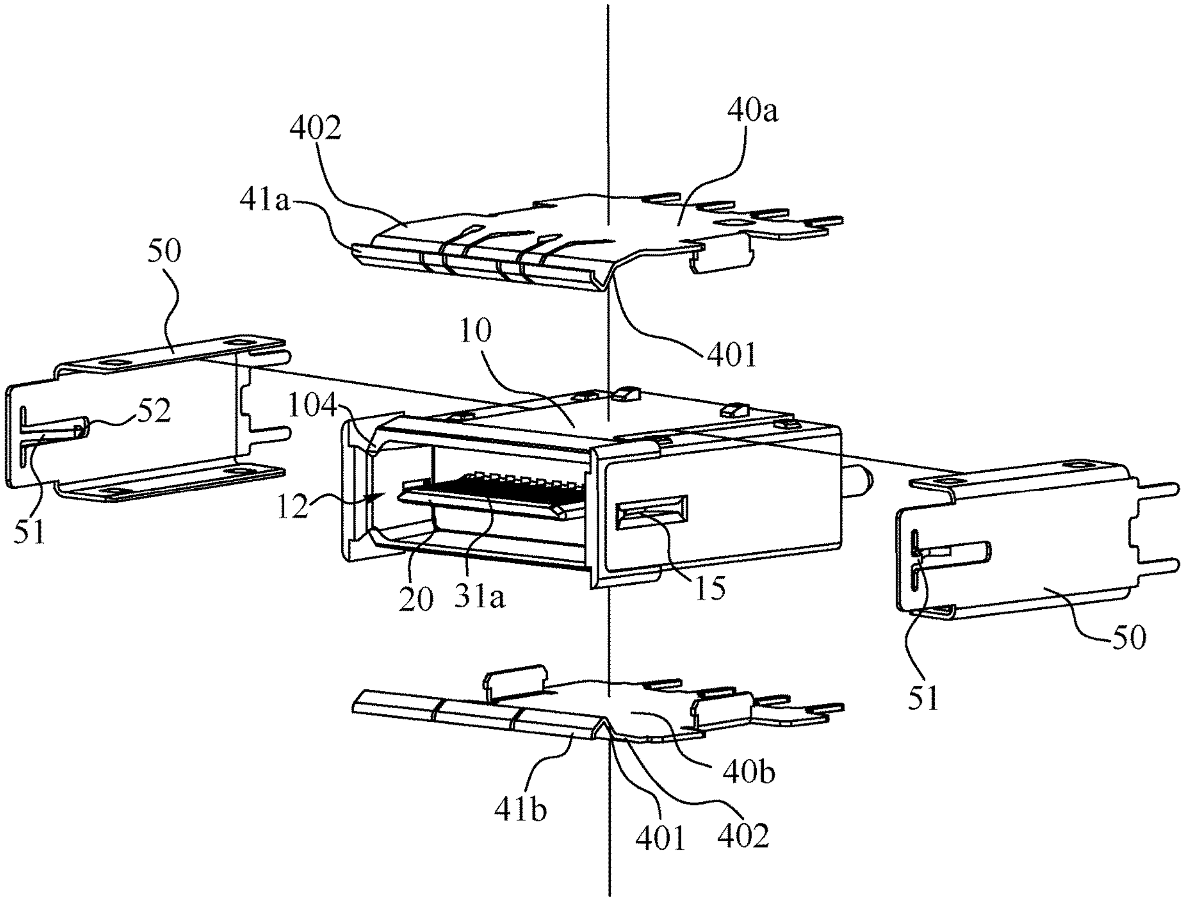
FIG. 3 is another partially exploded view of the female connector, wherein the two elastic elements and the two lateral shells are moved away from the female connector according to the preferred embodiment of the present invention.
Figure 4:
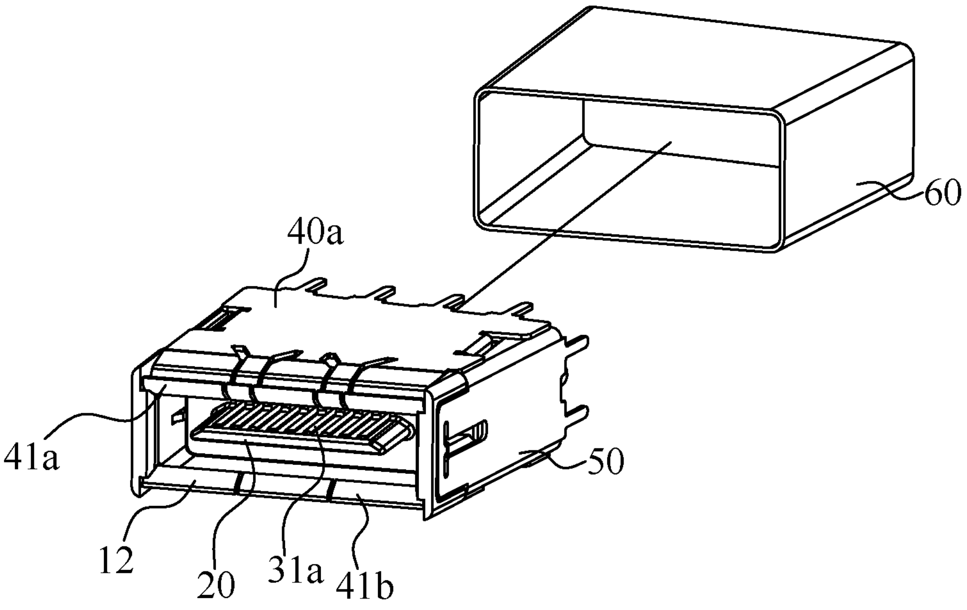
FIG. 4 is a partially exploded view of the female connector, wherein a metal shell is moved away from the female connector according to the preferred embodiment of the present invention.
Figure 5:
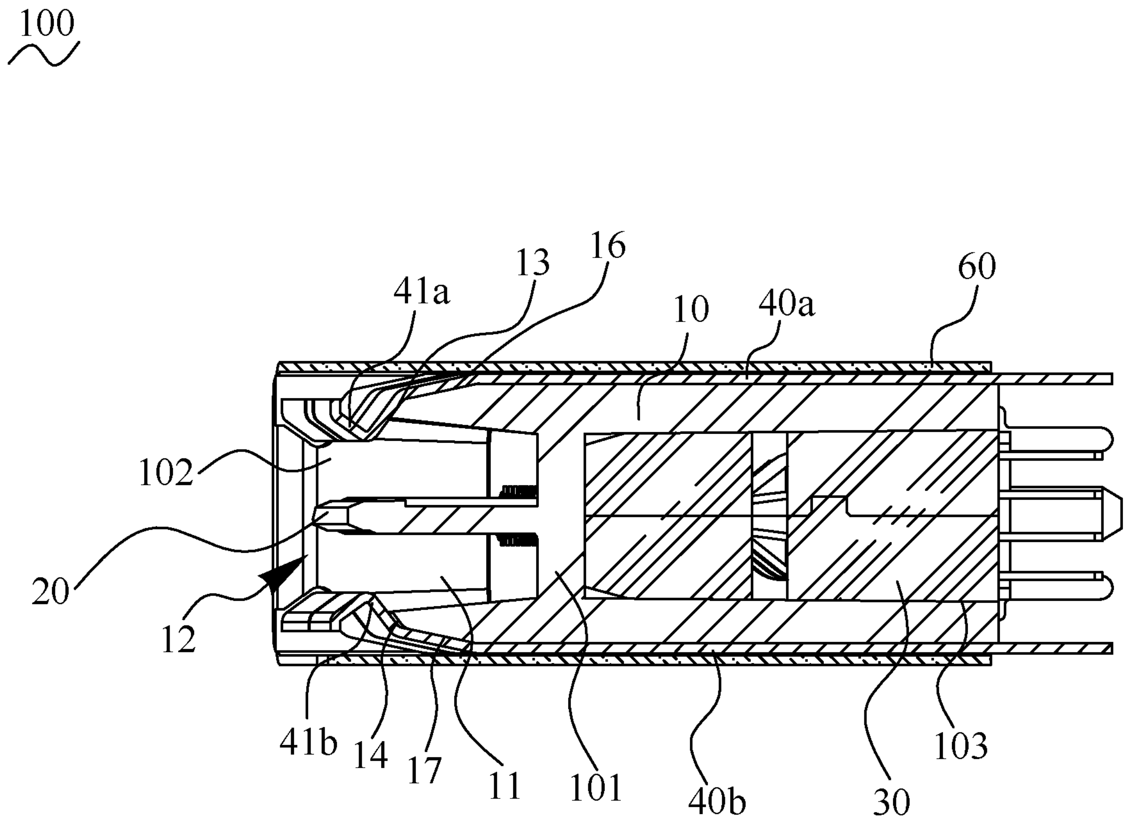
FIG. 5 is a sectional view of the female connector along a line A-A of FIG. 1.

Referring to FIG. 2, a female connector 100 in accordance with a preferred embodiment of the present invention is shown. The female connector 100 is adapted for being connected with a male connector (not shown). The female connector 100 includes an insulating body 10, a terminal module 30 assembled in the insulating body 10, at least one elastic element 40 mounted on or under the insulating body 10, at least one lateral shell 50 arranged at one side of the insulating body 10, and a metal shell 60 surrounding the insulating body 10, the at least one elastic element 40 and the at least one lateral shell 50. In the preferred embodiment, the female connector 100 includes two elastic elements 40 and two lateral shells 50. The two elastic elements 40 include an upper elastic element 40*a* and a lower elastic element 40*b*.

Figure 6:
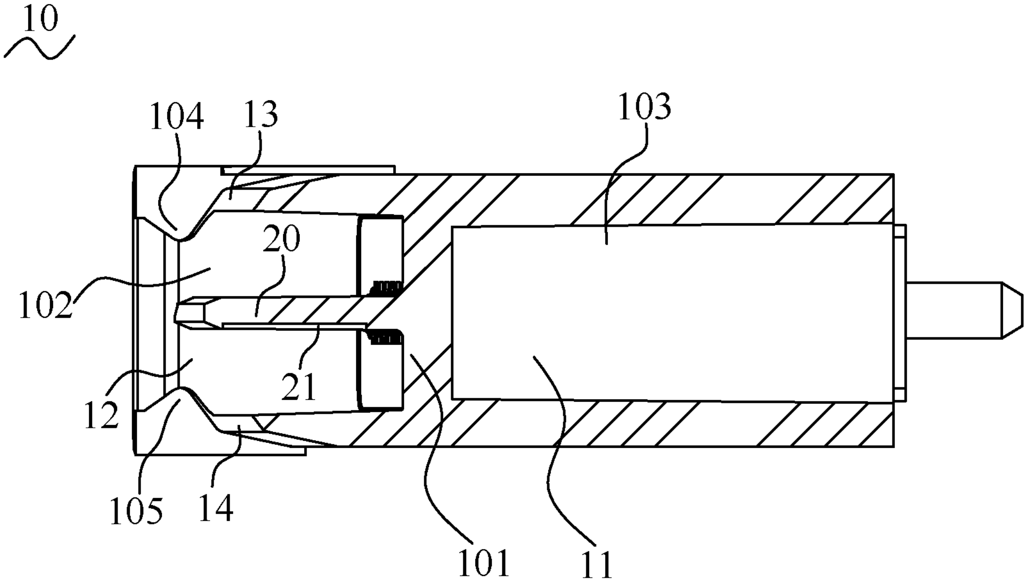
FIG. 6 is a sectional view of an insulating body of the female connector along the line A-A of FIG. 1.
Figure 7:
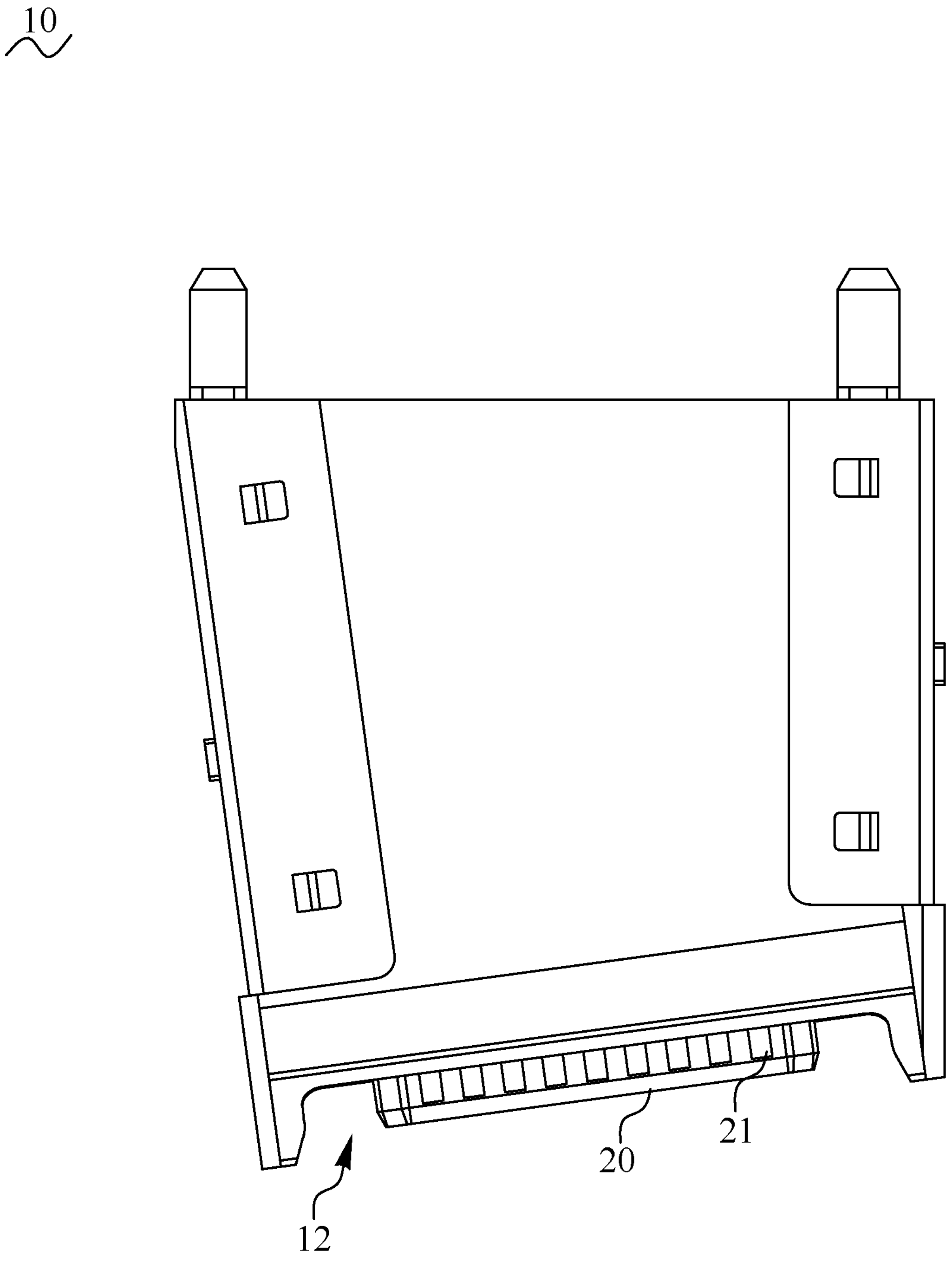
FIG. 7 is a top view of the insulating body of the female connector according to the preferred embodiment of the present invention.

Referring to FIG. 2 and FIG. 6, for a better illustration, a front end which is mentioned in the present invention, is defined as one end of the female connector 100 which is docked with the male connector. A rear end which is mentioned in the present invention, is defined as the other end of the female connector 100 that is soldered to a cable (not shown). A frontward direction of the female connector 100 is defined as a direction towards the male connector. A rearward direction of the female connector 100 is opposite to the frontward direction of the female connector 100.

Referring to FIG. 6, a middle of the insulating body 10 defines an accommodating space 11 penetrating through a front surface and a rear surface of the insulating body 10. The insulating body 10 has an isolating board 101 and a tongue board 20. The isolating board 101 and the tongue board 20 are integrally molded in the accommodating space 11 of the insulating body 10. The accommodating space 11 has the tongue board 20 which is integrally formed in the insulating body 10. The isolating board 101 is disposed vertically. The tongue board 20 is protruded towards the frontward direction from a middle of a front surface of the isolating board 101. The accommodating space 11 is divided into a first accommodating space 102 and a second accommodating space 103. The second accommodating space 103 is located behind the first accommodating space 102. The first accommodating space 102 and the second accommodating space 103 are isolated by the isolating board 101.

The tongue board 20 has a plurality of fixing holes 21 vertically penetrating through an upper surface and a lower surface of the tongue board 20. The plurality of the fixing holes 21 are arranged in an upper row of the fixing holes 21 and a lower row of the fixing holes 21. The upper row of the fixing holes 21 are arranged transversely. The lower row of the fixing holes 21 are arranged transversely. The upper row of the fixing holes 21 penetrate through an upper surface, the front surface and a rear surface of the tongue board 20. The lower row of the fixing holes 21 penetrate through a lower surface, the front surface and the rear surface of the tongue board 20. The tongue board 20 and a peripheral wall of a front end of the accommodating space 11 form a docking interface 12. A front end of the insulating body 10 surrounds the tongue board 20 to define the docking interface 12. The docking interface 12 is connected between the accommodating space 11 and an external space.

Figure 8:
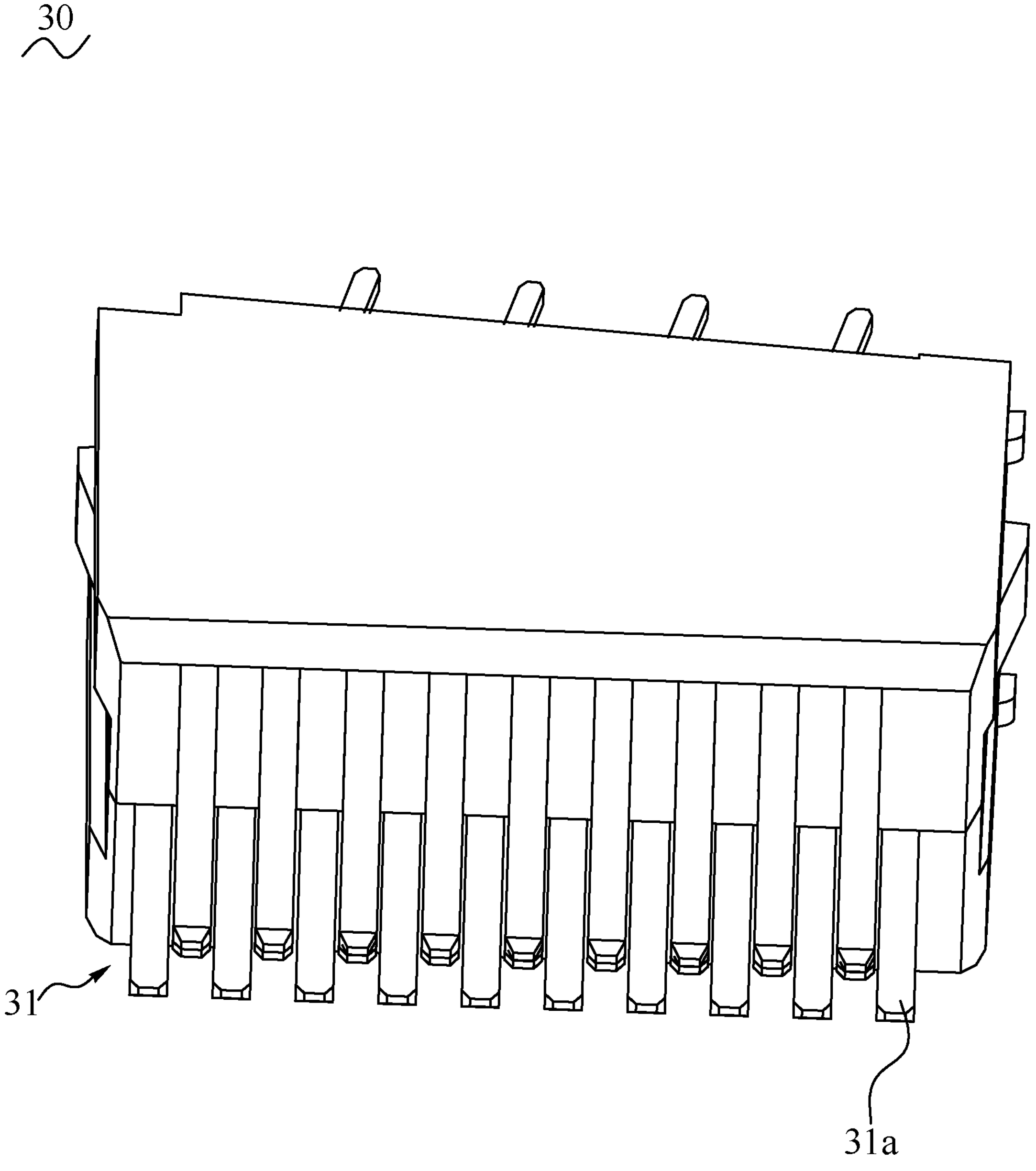
FIG. 8 is a perspective view of a terminal module of the female connector according to the preferred embodiment of the present invention.

Referring to FIG. 2, FIG. 6 and FIG. 8, the terminal module 30 has a plurality of connecting portions 31*a* assembled in the plurality of the fixing holes 21. The plurality of the connecting portions 31*a* are fastened in the plurality of the fixing holes 21. in this preferred embodiment, the terminal module 30 is mounted in the accommodating space 11. A rear end of the terminal module 30 is mounted in the second accommodating space 103. A front end of the terminal module 30 is mounted in the first accommodating space 102. The terminal module 30 includes a plurality of terminals 31. The plurality of the terminals 31 extend longitudinally and are mounted in the insulating body 10. The plurality of the terminals 31 are arranged transversely. The plurality of the terminals 31 are arranged at an upper portion of the terminal module 30 and a lower portion of the terminal module 30. The plurality of the terminals 31 are mounted in the plurality of the fixing holes 21. The plurality of the terminals 31 are arranged in an upper row of the terminals 31 and a lower row of the terminals 31. The upper row of the terminals 31 are arranged transversely. The lower row of the terminals 31 are arranged transversely. A front end of each terminal 31 has the connecting portion 31*a*. The plurality of the connecting portions 31*a* of the plurality of the terminals 31 are assembled in the plurality of the fixing holes 21.

The at least one elastic element 40 is mounted to a surface of the insulating body 10 which is parallel to an extending direction of each terminal 31. The at least one elastic element 40 has a clamping portion 41 extending towards the front end of the insulating body 10, and a transverse width of the clamping portion 41 is equal to a distance between two inner surfaces of two sides of the insulating body 10. Or the transverse width of the clamping portion 41 is more than the distance between the two inner surfaces of the two sides of the insulating body 10.

The upper elastic element 40*a* and the lower elastic element 40*b* are mounted to an upper surface and a lower surface of the insulating body 10 which are parallel to the extending direction of each terminal 31. The two lateral shells 50 are arranged to two side surfaces of the insulating body 10 which are perpendicular to the extending direction of each terminal 31. The two side surfaces of the insulating body 10 are connected between the upper surface and the lower surface of the insulating body 10. One side surface of the insulating body 10 is connected between one side of the upper surface of the insulating body 10 and one side of the lower surface of the insulating body 10. The other side surface of the insulating body 10 is connected between the other side of the upper surface of the insulating body 10 and the other side of the lower surface of the insulating body 10.

Referring to FIG. 1 to FIG. 6, in order to make an insertion and withdrawal force of the female connector 100 more stable, in the preferred embodiment, the insulating body 10 has an upper bevel 13 and a lower bevel 14. The upper bevel 13 is disposed at a front end of the upper surface of the insulating body 10, and the upper bevel 13 is inclined downward and frontward. The upper bevel 13 slantwise extends frontward and towards the docking interface 12. The lower bevel 14 is disposed at a front end of the lower surface of the insulating body 10, and the lower bevel 14 is inclined upward and frontward. The lower bevel 14 slantwise extends frontward and towards the docking interface 12. A transverse width of the upper bevel 13 is equal to the distance between the two inner surfaces of the two sides of the insulating body 10. Or the transverse width of the upper bevel 13 is more than the distance between the two inner surfaces of the two sides of the insulating body 10. A transverse width of the lower bevel 14 is equal to the distance between the two inner surfaces of the two sides of the insulating body 10. Or the transverse width of the lower bevel 14 is more than the distance between the two inner surfaces of the two sides of the insulating body 10. A rear end of the upper bevel 13 is inclined rearward and upward to form an upper inclination surface 16. A rear end of the lower bevel 14 is inclined rearward and downward to form a lower inclination surface 17.

The two elastic elements 40 are disposed at the upper surface and the lower surface of the insulating body 10 which are parallel to the extending direction of each terminal 31. Each elastic element 40 has the clamping portion 41 extending towards the front end of the insulating body 10. Two middle sections of the two clamping portions 41 of the two elastic elements 40 are inclined along two extending directions of the upper bevel 13 and the lower bevel 14 to form two contacting portions 401. The two contacting portions 401 of the two elastic elements 40 are covered to the upper bevel 13 and the lower bevel 14. Each clamping portion 41 is arched inward to form a hook-shaped structure. A convex surface of the hook-shaped structure faces inward. The two convex surfaces of the two hook-shaped structures project beyond the upper bevel 13 and the lower bevel 14. Two opposite side surfaces of the front end of the insulating body 10 are parallel to front surfaces of the two clamping portions 41 of the two elastic elements 40. The two opposite side surfaces of the front end of the insulating body 10 project beyond the front surfaces of the two clamping portions 41 of the two elastic elements 40. Two rear sections of the two clamping portions 41 of the two elastic elements 40 are inclined along two extending directions of the upper inclination surface 16 and the lower inclination surface 17 to form two covering portions 402. The two covering portions 402 of the two elastic elements 40 are covered to the upper inclination surface 16 and the lower inclination surface 17.

The insulating body 10 has the upper inclination surface 16 disposed at the front end of the upper surface of the insulating body 10, and the lower inclination surface 17 disposed at the front end of the lower surface of the insulating body 10. The upper inclination surface 16 is inclined frontward and towards the docking interface 12. The lower inclination surface 17 is inclined frontward and towards the docking interface 12. A transverse width of each of the upper inclination surface 16 and the lower inclination surface 17 is equal to the distance between the two inner surfaces of the two sides of the insulating body 10. Or the transverse width of each of the upper inclination surface 16 and the lower inclination surface 17 is more than the distance between the two inner surfaces of the two sides of the insulating body 10.

A front end of the upper elastic element 40*a* is arched downward and then protrudes upward to form an upper clamping portion 41*a*. A middle section of the upper clamping portion 41*a* is inclined downward and frontward to form an upper contacting portion 411. A rear section of the upper clamping portion 41*a* is inclined rearward and upward to form an upper covering portion 412. The upper clamping portion 41*a* extends towards the front end of the insulating body 10. A transverse width of the upper clamping portion 41*a* of the upper elastic element 40*a* is equal to a distance between the two sides of the insulating body 10. The upper clamping portion 41*a* of the upper elastic element 40*a* is clamped between the two inner surfaces of the two sides of the insulating body 10. The upper contacting portion 411 of the upper clamping portion 41*a* is covered to the entire upper bevel 13. The upper covering portion 412 is covered to the upper inclination surface 16. The upper clamping portion 41*a* is the hook-shaped structure. A convex surface of the upper clamping portion 41*a* faces towards downward. The upper clamping portion 41*a* projects beyond a front end of the upper bevel 13.

The lower elastic element 40*b* is mounted to the lower surface of the insulating body 10. A front end of the lower elastic element 40*b* is arched upward and then protrudes downward to form a lower clamping portion 41*b*. The lower clamping portion 41*b* is corresponding to the upper clamping portion 41*a*. A middle section of the lower clamping portion 41*b* is inclined upward and frontward to form a lower contacting portion 413. A rear section of the lower clamping portion 41*b* is inclined rearward and downward to form a lower covering portion 414. The lower clamping portion 41*b* extends towards the front end of the insulating body 10. A transverse width of the lower clamping portion 41*b* of the lower elastic element 40*b* is equal to a distance between the two sides of the insulating body 10. The lower clamping portion 41*b* of the lower elastic element 40*b* is clamped between the two inner surfaces of the two sides of the insulating body 10. The lower contacting portion 413 of the lower clamping portion 41*b* is covered to the entire lower bevel 14. The lower covering portion 414 is covered to the lower inclination surface 17. The lower clamping portion 41*b* is the hook-shaped structure. A convex surface of the lower clamping portion 41*b* faces towards upward. The lower clamping portion 41*b* projects beyond a front end of the lower bevel 14. The at least one elastic element 40 is the upper elastic element 40*a* or the lower elastic element 40*b*. The clamping portion 41 is the upper clamping portion 41*a* or the lower clamping portion 41*b*.

The transverse width of the upper clamping portion 41*a* and the transverse width of the lower clamping portion 41*b* are designed to be equal to the distance between the two sides of the insulating body 10 to increase contacting areas of the upper clamping portion 41*a* and the lower clamping portion 41*b*. The upper clamping portion 41*a* and the lower clamping portion 41*b* exert clamping forces to an upper surface and a lower surface of the docking interface 12 to stabilize a connection between the female connector 100 and the male connector. The two opposite side surfaces of the front end of the insulating body 10 project beyond the front ends of the upper clamping portion 41*a* and the lower clamping portion 41*b* to protect the upper clamping portion 41*a* and the lower clamping portion 41*b*, so the upper clamping portion 41*a* and the lower clamping portion 41*b* are prevented from deforming due to accidental collisions. Two sides of the front end of the upper surface of the insulating body 10 are recessed downward to form two upper avoiding spaces 104 for receiving two sides of the upper clamping portion 41*a*. Two sides of the front end of the lower surface of the insulating body 10 are recessed upward to form two lower avoiding spaces 105 for receiving two sides of the lower clamping portion 41*b*. Profiles of the two upper avoiding spaces 104 and the two lower avoiding spaces 105 are matched with profiles of the upper clamping portion 41*a* and the lower clamping portion 41*b*.

Referring to FIG. 1 to FIG. 8, at least one side of the insulating body 10 defines an opening 15 transversely penetrating through the at least one side of the insulating body 10. The at least one opening 15 is communicated between the first accommodating space 102 and the external space. In order to enhance the insertion and withdrawal force of the two sides of the female connector 100, front ends of the two sides of the insulating body 10 define two openings 15 transversely penetrating through the two sides of the insulating body 10.

The at least one lateral shell 50 is assembled to at least one side surface of the insulating body 10. The at least one lateral shell 50 is disposed perpendicular to the extending direction of each terminal 31. The at least one lateral shell 50 has a spring arm 51 arranged corresponding to the opening 15, and a curved structure 52 arched inward from a tail end of the spring arm 51. The spring arm 51 is extended from a front end of the at least one lateral shell 50 to a rear end of the at least one lateral shell 50, and then is inclined towards the at least one side surface of the insulating body 10, so an extending direction of a front end of the spring arm 51 is parallel to an insertion direction of the male connector to avoid the spring arm 51 from breaking or deforming.

Middles of the front ends of the two lateral shells 50 are punched inward to form two spring arms 51. The two spring arms 51 of the two lateral shells 50 are extended from the front ends of the two lateral shells 50 to the rear ends of the two lateral shells 50, and then the two spring arms 51 of the two lateral shells 50 are inclined towards the two side surfaces of the insulating body 10, so an extending direction of the front end of each spring arm 51 is parallel to the insertion direction of the male connector to avoid each spring arm 51 from breaking or deforming. The two spring arms 51 are arranged corresponding to the two openings 15. The tail end of each spring arm 51 is arched inward to form the curved structure 52. The curved structures 52 of the two lateral shells 50 project into the docking interface 12 via the two openings 15. The curved structures 52 of the two lateral shells 50 project into the accommodating space 11 from the two openings 15.

When the male connector is inserted into the female connector 100, the curved structures 52 of the two lateral shells 50 abut against the male connector to increase the insertion and withdrawal force of the two sides of the female connector 100. In the preferred embodiment, in order to further avoid the spring arms 51 of the two lateral shells 50 from breaking or deforming, one spring arm 51 is arranged at one side of the insulating body 10, and the one spring arm 51 extends from the front end of one lateral shell 50 to the rear end of the one lateral shell 50 and then is inclined towards the one side of the insulating body 10. The other spring arm 51 is arranged at the other side of the insulating body 10, and the other spring arm 51 extends from the front end of the other lateral shell 50 to the rear end of the other lateral shell 50 and then is inclined towards the other side of the insulating body 10. The female connector 100 enhances the insertion and withdrawal force and prevents the spring arm 51 of each lateral shell 50 from breaking or deforming. Therefore, extension directions of the two spring arms 51 are nearly the same as an insertion direction of the male connector, so that the male connector is more easily inserted into the docking interface 12.

Referring to FIG. 2 to FIG. 5, in the preferred embodiment, the metal shell 60 surrounds the two elastic elements 40 and the two lateral shells 50. The metal shell 60 covers interstices formed among the two elastic elements 40 and the two lateral shells 50 to prevent an external signal interference, so signals of the female connector 100 are more stable.

Referring to FIG. 1 to FIG. 8, in order to increase a difficulty of imitating the female connector 100, the upper surface and the lower surface of the insulating body 10 are symmetrical to each other with respect to a middle of the insulating body 10. The upper surface and the lower surface of the insulating body 10 are parallel to each other. The upper surface and the lower surface of the insulating body 10 are designed in irregular shapes. The two side surfaces of the insulating body 10 are perpendicular to the upper surface and the lower surface of the insulating body 10, so that the insulating body 10 is in an irregular three-dimensional shape, and the difficulty of imitating the female connector 100 is increased.

As described above, the transverse width of the upper clamping portion 41*a* and the transverse width of the lower clamping portion 41*b* are designed to be equal to the distance between the two sides of the insulating body 10 to increase the contacting areas of the upper clamping portion 41*a* and the lower clamping portion 41*b*. Moreover, the upper clamping portion 41*a* and the lower clamping portion 41*b* exert the clamping forces to the upper surface and the lower surface of the docking interface 12, so the female connector 100 enhances the insertion and withdrawal force and prevents the spring arm 51 from breaking or deforming to stabilize the connection between the female connector 100 and the male connector.

What is claimed is:

1. A female connector adapted for being connected with a male connector, the female connector comprising:

an insulating body, at least one side of the insulating body defining an opening transversely penetrating through the at least one side of the insulating body, a middle of the insulating body defining an accommodating space penetrating through a front surface and a rear surface of the insulating body;

a terminal module mounted in the accommodating space, the terminal module including a plurality of terminals, the plurality of the terminals extending longitudinally and being mounted in the insulating body, the plurality of the terminals being arranged transversely;

at least one elastic element mounted to a surface of the insulating body which is parallel to an extending direction of each terminal, the at least one elastic element having a clamping portion extending towards a front end of the insulating body, and a transverse width of the clamping portion being equal to a distance between two inner surfaces of two sides of the insulating body; and at least one lateral shell assembled to at least one side surface of the insulating body, the at least one lateral shell being disposed perpendicular to the extending direction of each terminal, the at least one lateral shell having a spring arm arranged corresponding to the opening, and a curved structure arched inward from a tail end of the spring arm;

wherein the spring arm is extended from a front end of the at least one lateral shell to a rear end of the at least one lateral shell, and then is inclined towards the at least one side surface of the insulating body, so an extending direction of a front end of the spring arm is parallel to an insertion direction of the male connector to avoid the spring arm from breaking or deforming.

2. The female connector as claimed in claim 1, wherein the accommodating space has a tongue board which is integrally formed in the insulating body, the tongue board has a plurality of fixing holes vertically penetrating through an upper surface and a lower surface of the tongue board, the tongue board and a peripheral wall of a front end of the accommodating space form a docking interface, the docking interface is connected between the accommodating space and an external space, the terminal module has a plurality of connecting portions assembled in the plurality of the fixing holes, the plurality of the connecting portions are fastened in the plurality of the fixing holes.

3. The female connector as claimed in claim 2, wherein the insulating body has an upper bevel and a lower bevel, the upper bevel is disposed at a front end of an upper surface of the insulating body, the upper bevel slantwise extends frontward and towards the docking interface, the lower bevel is disposed at a front end of a lower surface of the insulating body, the lower bevel slantwise extends frontward and towards the docking interface, a transverse width of the upper bevel is equal to the distance between the two inner surfaces of the two sides of the insulating body, a transverse width of the lower bevel is equal to the distance between the two inner surfaces of the two sides of the insulating body.

4. The female connector as claimed in claim 3, wherein the female connector includes two elastic elements, each elastic element has the clamping portion, the two elastic elements are disposed at the upper surface and the lower surface of the insulating body which are parallel to the extending direction of each terminal, two middle sections of the two clamping portions of the two elastic elements are inclined along two extending directions of the upper bevel and the lower bevel to form two contacting portions, the two contacting portions of the two elastic elements are covered to the upper bevel and the lower bevel, each clamping portion is arched inward to form a hook-shaped structure, a convex surface of the hook-shaped structure faces inward, the two convex surfaces of the two hook-shaped structures project beyond the upper bevel and the lower bevel, two opposite side surfaces of the front end of the insulating body are parallel to front surfaces of the two clamping portions of the two elastic elements.

5. The female connector as claimed in claim 4, wherein the two opposite side surfaces of the front end of the insulating body project beyond the front surfaces of the two clamping portions of the two elastic elements.

6. The female connector as claimed in claim 2, wherein the insulating body has an upper inclination surface disposed at a front end of an upper surface of the insulating body, and a lower inclination surface disposed at a front end of a lower surface of the insulating body, the upper inclination surface is inclined frontward and towards the docking interface, the lower inclination surface is inclined frontward and towards the docking interface, a transverse width of each of the upper inclination surface and the lower inclination surface is equal to the distance between the two inner surfaces of the two sides of the insulating body.

7. The female connector as claimed in claim 6, wherein the female connector includes two elastic elements, the two elastic elements are disposed at the upper surface and the lower surface of the insulating body which are parallel to the extending direction of each terminal, each elastic element has the clamping portion, two rear sections of the two clamping portions of the two elastic elements are inclined along two extending directions of the upper inclination surface and the lower inclination surface to form two covering portions, the two covering portions of the two elastic elements are covered to the upper inclination surface and the lower inclination surface.

8. The female connector as claimed in claim 7, wherein the female connector includes two lateral shells, the two lateral shells are arranged at two side surfaces of the insulating body which are perpendicular to the extending direction of each terminal, the two spring arms of the two lateral shells are extended from front ends of the two lateral shells to rear ends of the two lateral shells, and then the two spring arms of the two lateral shells are inclined towards the two side surfaces of the insulating body.

9. The female connector as claimed in claim 8, further comprising a metal shell surrounding the two elastic elements and the two lateral shells, the metal shell covering interstices formed among the two elastic elements and the two lateral shells.

10. The female connector as claimed in claim 1, wherein the female connector includes two elastic elements, the two elastic elements include an upper elastic element and a lower elastic element, the upper elastic element and the lower elastic element are mounted to an upper surface and a lower surface of the insulating body.

11. The female connector as claimed in claim 10, wherein a front end of the upper elastic element is arched downward and then protrudes upward to form an upper clamping portion, a front end of the lower elastic element is arched upward and then protrudes downward to form a lower clamping portion, two sides of the front end of the upper surface of the insulating body are recessed downward to form two upper avoiding spaces for receiving two sides of the upper clamping portion, two sides of the front end of the lower surface of the insulating body are recessed upward to form two lower avoiding spaces for receiving two sides of the lower clamping portion, profiles of the two upper avoiding spaces and the two lower avoiding spaces are matched with profiles of the upper clamping portion and the lower clamping portion.

12. A female connector, comprising:

an insulating body, two sides of the insulating body defining two openings transversely penetrating through the two sides of the insulating body, a middle of the insulating body defining an accommodating space penetrating through a front surface and a rear surface of the insulating body;

a terminal module mounted in the accommodating space, the terminal module including a plurality of terminals, the plurality of the terminals extending longitudinally and being mounted in the insulating body, the plurality of the terminals being arranged transversely;

two elastic elements disposed at an upper surface and a lower surface of the insulating body which are parallel to an extending direction of each terminal, each elastic element having a clamping portion extending towards a front end of the insulating body, and a transverse width of the clamping portion being equal to or more than a distance between two inner surfaces of two sides of the insulating body; and two lateral shells arranged to two side surfaces of the insulating body which are perpendicular to the extending direction of each terminal, middles of front ends of the two lateral shells being punched inward to form two spring arms, the two spring arms being arranged corresponding to the two openings, a tail end of each spring arm being arched inward to form a curved structure, the curved structures of the two lateral shells projecting into the accommodating space from the two openings;

wherein the two spring arms of the two lateral shells are extended from front ends of the two lateral shells to rear ends of the two lateral shells, and then the two spring arms of the two lateral shells are inclined towards the two side surfaces of the insulating body, so an extending direction of a front end of each spring arm is parallel to an insertion direction of the male connector to avoid each spring arm from breaking or deforming.

13. A female connector, comprising:

an insulating body, two sides of the insulating body defining two openings transversely penetrating through the two sides of the insulating body, a middle of the insulating body defining an accommodating space penetrating through a front surface and a rear surface of the insulating body, the insulating body having an upper bevel disposed at a front end of an upper surface of the insulating body, and a lower bevel disposed at a front end of a lower surface of the insulating body, the upper bevel being inclined downward and frontward, the lower bevel being inclined upward and frontward, a transverse width of the upper bevel being equal to or more than a distance between two inner surfaces of the two sides of the insulating body, a transverse width of the lower bevel being equal to or more than the distance between the two inner surfaces of the two sides of the insulating body;

a terminal module mounted in the accommodating space, the terminal module including a plurality of terminals, the plurality of the terminals extending longitudinally and being mounted in the insulating body, the plurality of the terminals being arranged transversely;

two elastic elements disposed at an upper surface and a lower surface of the insulating body which are parallel to an extending direction of each terminal, each elastic element having a clamping portion extending towards a front end of the insulating body, and a transverse width of the clamping portion being equal to or more than a distance between two inner surfaces of two sides of the insulating body, two middle sections of the two clamping portions of the two elastic elements being inclined along two extending directions of the upper bevel and the lower bevel to form two contacting portions, the two contacting portions of the two elastic elements being covered to the upper bevel and the lower bevel; and two lateral shells arranged to two side surfaces of the insulating body which are perpendicular to the extending direction of each terminal, middles of front ends of the two lateral shells being punched inward to form two spring arms, the two spring arms being arranged corresponding to the two openings, a tail end of each spring arm being arched inward to form a curved structure, the curved structures of the two lateral shells projecting into the accommodating space from the two openings.

14. The female connector as claimed in claim 13, wherein a rear end of the upper bevel is inclined rearward and upward to form an upper inclination surface, a rear end of the lower bevel is inclined rearward and downward to form a lower inclination surface, a transverse width of each of the upper inclination surface and the lower inclination surface is equal to or more than the distance between the two inner surfaces of the two sides of the insulating body, two rear sections of the two clamping portions of the two elastic elements are inclined along two extending directions of the upper inclination surface and the lower inclination surface to form two covering portions, the two covering portions of the two elastic elements are covered to the upper inclination surface and the lower inclination surface.

* * * * *